(12) United States Patent
Zhao et al.

(10) Patent No.: US 12,183,004 B2
(45) Date of Patent: Dec. 31, 2024

(54) METHOD AND DEVICE FOR EXTRACTING BLOOD VESSEL WALL

(71) Applicant: GE Precision Healthcare LLC, Wauwatosa, WI (US)

(72) Inventors: Zhoushe Zhao, Milwaukee, WI (US); Yingbin Nie, Milwaukee, WI (US); Chen Zhang, Milwaukee, WI (US)

(73) Assignee: GE Precision Healthcare LLC, Waukesha, WI (US)

( * ) Notice: Subject to any disclaimer, the term of this patent is extended or adjusted under 35 U.S.C. 154(b) by 481 days.

(21) Appl. No.: 17/644,268

(22) Filed: Dec. 14, 2021

(65) Prior Publication Data

US 2022/0198667 A1   Jun. 23, 2022

(30) Foreign Application Priority Data

Dec. 17, 2020 (CN) .......................... 202011495067.9

(51) Int. Cl.
| | |
|---|---|
| *G06T 7/00* | (2017.01) |
| *G06N 3/02* | (2006.01) |
| *G06T 7/11* | (2017.01) |
| *G06V 10/25* | (2022.01) |

(52) U.S. Cl.
CPC ............ *G06T 7/0014* (2013.01); *G06N 3/02* (2013.01); *G06T 7/11* (2017.01); *G06V 10/25* (2022.01); *G06T 2207/20084* (2013.01); *G06T 2207/30104* (2013.01)

(58) Field of Classification Search
CPC .................. G06T 7/0014; G06T 7/11; G06T 2207/20084; G06T 2207/30104; G06T 7/136; G06T 7/155; G06T 7/187; G06T 2207/30101; G06T 7/12; G06T 2207/10081; G06T 2207/20081; G06N 3/02; G06N 3/045; G06N 3/08; G06V 10/25; G06V 10/26; G06V 10/82; G06V 2201/03
USPC ........................................................ 382/128
See application file for complete search history.

(56) References Cited

U.S. PATENT DOCUMENTS

| | | | |
|---|---|---|---|
| 8,437,520 B2 * | 5/2013 | Manabe | G06T 7/12 382/128 |
| 2015/0356734 A1 * | 12/2015 | Ooga | A61B 6/486 382/131 |
| 2018/0000441 A1 * | 1/2018 | Wang | G06V 10/755 |
| 2022/0028077 A1 * | 1/2022 | Seo | G06T 7/30 |

FOREIGN PATENT DOCUMENTS

| | | | | |
|---|---|---|---|---|
| CN | 101833757 A | * | 9/2010 | |
| CN | 102163326 A | * | 8/2011 | |
| CN | 105167798 A | * | 12/2015 | |
| CN | 105741299 A | * | 7/2016 | .......... G06T 7/0012 |

(Continued)

*Primary Examiner* — Juan A Torres
(74) *Attorney, Agent, or Firm* — McAndrews, Held & Malloy, Ltd.; Greg Threadgill; Lucas Divine (57) ABSTRACT

Provided in the present application are a method and a device for extracting a blood vessel wall, a medical imaging system, and a non-transitory computer-readable storage medium. The method for extracting a blood vessel wall comprises acquiring a medical image, determining at least one first-order feature in the medical image, and extracting, on the basis of the at least one first-order feature, a blood vessel wall image from the medical image.

16 Claims, 9 Drawing Sheets

(56) References Cited

FOREIGN PATENT DOCUMENTS

| WO | WO-2017047819 A1 * | 3/2017 | | |
| WO | 20200197381 W | 1/2020 | | |
| WO | WO-2020019738 A1 * | 1/2020 | ........... | G06K 9/6256 |
| WO | WO-2020111557 A1 * | 6/2020 | ........... | A61B 5/0036 |

* cited by examiner

METHOD AND DEVICE FOR EXTRACTING BLOOD VESSEL WALL

CROSS-REFERENCE TO RELATED APPLICATIONS

This application claims priority pursuant to 35 U.S.C. 119(a) to China Patent Application No. 202011495067.9, filed Dec. 17, 2020, which application is incorporated herein by reference in its entirety.

TECHNICAL FIELD

The present invention relates to medical image processing, in particular to a method and a device for extracting a blood vessel wall, a medical imaging system, and a non-transitory computer-readable storage medium.

BACKGROUND

Computed tomography angiography (CTA) technology is a non-invasive injury-free examination method, which is to acquire medical images by processing and reconstructing data obtained after injecting a contrast agent and performing a CT scan. The technology is applicable to examination of blood vessels in various parts of the human body, such as the coronary artery, carotid artery, cerebral artery, or pulmonary artery.

The CTA can be used to determine the degree of vascular stenosis and degree of calcification, and used for plaque analysis. For the plaque analysis, the CTA can provide other valuable information about plaques different from those from magnetic resonance imaging or contrast-enhanced ultrasound. However, plaques are present on blood vessel walls. Since there is little difference between the composition of the plaques and the composition of soft tissues around the blood vessels, automatic analysis of plaques in CTA is a challenging issue, and the automatic analysis of plaques is on the premise that the blood vessel walls are segmented and extracted.

SUMMARY

Provided in the present invention are a method and a device for extracting a blood vessel wall, a medical imaging system, and a non-transitory computer-readable storage medium.

Further provided in an exemplary embodiment of the present invention is a method for extracting a blood vessel wall. The method comprises acquiring a medical image; determining at least one first-order feature in the medical image; and extracting, on the basis of the at least one first-order feature, a blood vessel wall image from the medical image.

Specifically, the acquiring a medical image comprises preprocessing an original scanned image, and using the preprocessed image as the medical image.

Specifically, the acquiring a medical image further comprises performing image segmentation on the original scanned image and determining a region of interest; and acquiring the medical image on the basis of the region of interest.

Specifically, the image segmentation comprises determining, on the basis of a deep learning network, the region of interest comprising a blood vessel lumen in the original scanned image.

Specifically, the acquiring a medical image further comprises optimizing the region of interest on the basis of at least one of a region growing algorithm and a threshold method, and acquiring the medical image on the basis of the optimized region of interest.

Specifically, the acquiring the medical image on the basis of the region of interest comprises expanding the region of interest to acquire the medical image.

Specifically, the method for extracting a blood vessel wall further comprises performing a plaque analysis on the basis of the blood vessel wall image.

Specifically, the method for extracting a blood vessel wall further comprises correcting an expansion extent of the region of interest on the basis of a result of the plaque analysis.

Specifically, the at least one first-order feature comprises at least one of an energy value, a maximum value, a mean value, a variance value, a mean absolute deviation value, a regional uniformity, and an entropy value.

Provided in an exemplary embodiment of the present invention is a method for visualizing a blood vessel wall. The method comprises acquiring a medical image; determining at least one first-order feature in the medical image; and mapping the at least one first-order feature in the medical image to visualize the blood vessel wall.

Further provided in an exemplary embodiment of the present invention is a non-transitory computer-readable storage medium for storing a computer program, wherein when executed by a computer, the computer program causes the computer to execute instructions for the method for extracting a blood vessel wall described above.

Further provided an exemplary embodiment of the present invention is a device for extracting a blood vessel wall. The device comprises an image acquisition module, a feature calculation module, and an image extraction module module. The image acquisition module is configured to acquire a medical image, the feature calculation module is configured to determine at least one first-order feature in the medical image, and the image extraction module is configured to extract, on the basis of the at least one first-order feature, a blood vessel wall image from the medical image.

Specifically, the image acquisition module comprises a preprocessing unit, configured to preprocess an original scanned image, and use the preprocessed image as the medical image.

Specifically, the image acquisition module comprises an image segmentation unit and a region expansion unit, wherein the image segmentation unit is configured to perform image segmentation on the original scanned image and determine a region of interest, and the region expansion unit is configured to acquire the medical image on the basis of the region of interest.

Specifically, the image segmentation unit is further configured to determine, on the basis of a deep learning network, the region of interest comprising a blood vessel lumen in the original scanned image.

Specifically, the image acquisition module further comprises a region optimization unit, configured to optimize the region of interest on the basis of at least one of a region growing algorithm and a threshold method, and acquire the medical image on the basis of the optimized region of interest.

Specifically, the region expansion unit is further configured to expand the region of interest to acquire the medical image.

Specifically, the device for extracting a blood vessel wall further comprises a plaque analysis module, configured to perform a plaque analysis on the basis of the blood vessel wall image.

Specifically, the device for extracting a blood vessel wall further comprises a feedback module, configured to correct an expansion extent of the region of interest on the basis of a result of the plaque analysis.

An exemplary embodiment of the present invention further provides a medical imaging system, comprising the above device for extracting a blood vessel wall.

Other features and aspects will become clear through the following detailed description, accompanying drawings, and claims.

BRIEF DESCRIPTION OF THE DRAWINGS

The present invention may be better understood by means of the description of exemplary embodiments of the present invention with reference to accompanying drawings, in which.

DETAILED DESCRIPTION

Specific implementations of the present invention will be described in the following. It should be noted that during the specific description of the implementations, it is impossible to describe all features of the actual implementations in detail in this description for the sake of brief description. It should be understood that in the actual implementation of any of the implementations, as in the process of any engineering project or design project, a variety of specific decisions are often made in order to achieve the developer's specific objectives and meet system-related or business-related restrictions, which will vary from one implementation to another. Moreover, it can also be understood that although the efforts made in such development process may be complex and lengthy, for those of ordinary skill in the art related to content disclosed in the present invention, some changes in design, manufacturing, production or the like based on the technical content disclosed in the present disclosure are only conventional technical means, and should not be construed as that the content of the present disclosure is insufficient.

Unless otherwise defined, the technical or scientific terms used in the claims and the description are as they are usually understood by those of ordinary skill in the art to which the present invention pertains. The terms "first," "second," and similar terms used in the description and claims of the patent application of the present invention do not denote any order, quantity, or importance, but are merely intended to distinguish between different constituents. The term "one", "a(n)", or a similar term is not meant to be limiting, but rather denote the presence of at least one. The term "include", "comprise", or a similar term is intended to mean that an element or article that appears before "include" or "comprise" encompasses an element or article and equivalent elements that are listed after "include" or "comprise", and does not exclude other elements or articles. The term "connect", "connected", or a similar term is not limited to a physical or mechanical connection, and is not limited to a direct or indirect connection.

As used in the present invention, the term "the subject under examination" may include any object being imaged.

It should be noted that from the perspective of those of ordinary skill in the art or related art, such description should not be construed as limiting the present invention only to a CT system. In fact, the method and device for extracting a blood vessel wall described here may be reasonably applied to other imaging fields in medical fields or non-medical fields, such as X-ray systems, PET systems, SPECT systems, MR systems, or any combination thereof.

Figure 1:
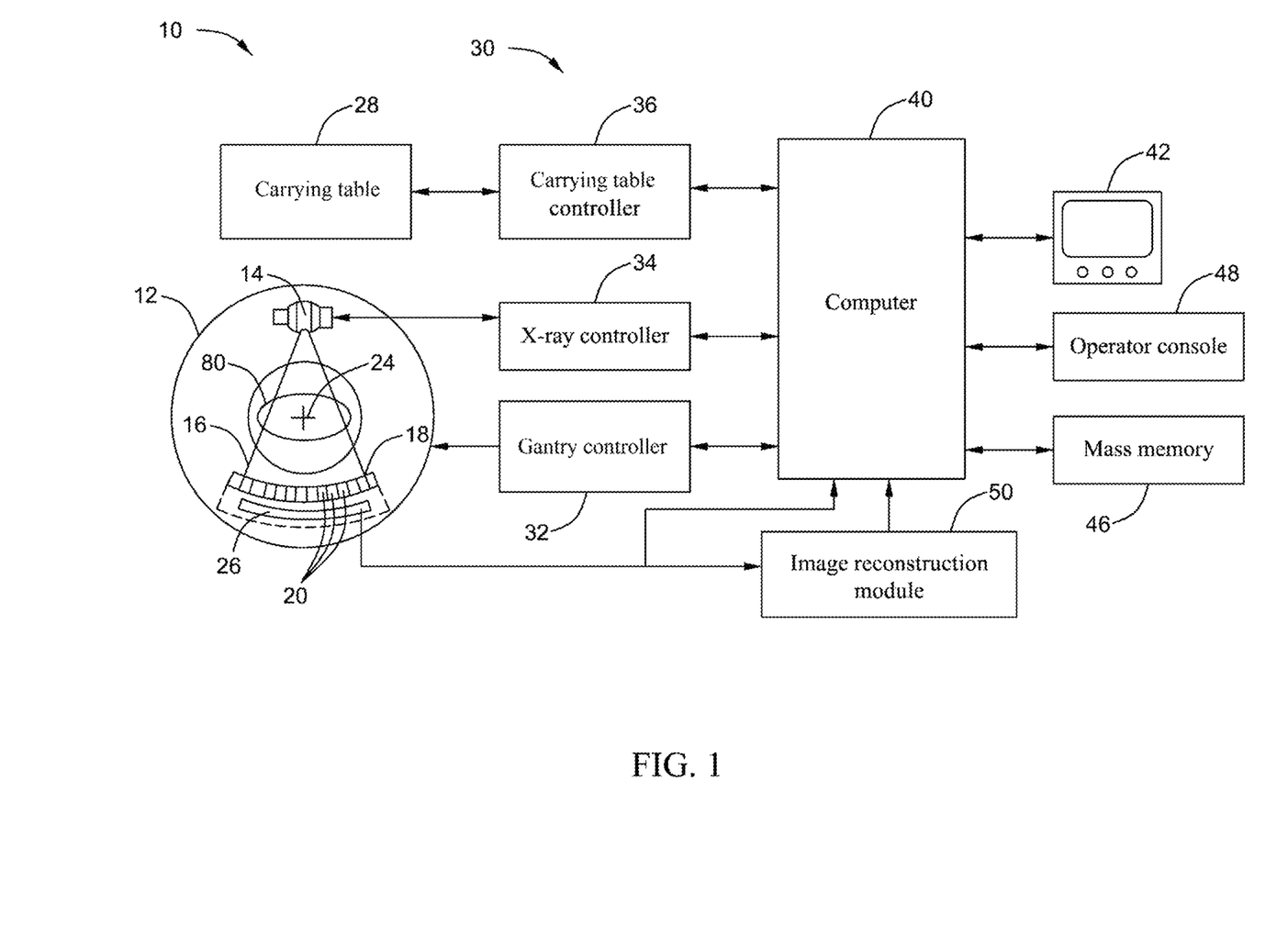
FIG. 1 is a schematic diagram of a CT system according to some embodiments of the present invention.

FIG. 1 is a schematic diagram of a CT system 10 according to some embodiments of the present invention. As shown in FIG. 1, the system 10 includes a gantry 12. An X-ray source 14 and a detector array 18 are disposed opposite to each other on the gantry 12. The detector array 18 is composed of a plurality of detectors 20 and a data acquisition system (DAS) 26. The DAS 26 is configured to convert sampled analog data of analog attenuation data received by the plurality of detectors 20 into digital signals for subsequent processing. In some embodiments, the system 10 is used for acquiring projection data of a subject under examination at different angles. Thus, components on the gantry 12 are used for rotating around a rotation center 24 to acquire projection data. During rotation, the X-ray radiation source 14 is configured to emit X-rays 16 that penetrate the subject under examination toward the detector array 18. The attenuated X-ray beam data is preprocessed and then used as projection data of a target volume of the subject. An image of the subject under examination may be reconstructed based on the projection data. The reconstructed image may display internal features of the subject under examination. These features include, for example, the lesion, size, and shape of a body tissue structure. The rotation center 24 of the gantry also defines a center of a scanning field 80.

The system 10 further includes an image reconstruction module 50. As described above, the DAS 26 samples and digitizes the projection data acquired by the plurality of detectors 20. Next, the image reconstruction module 50 performs high-speed image reconstruction based on the aforementioned sampled and digitized projection data. In some embodiments, the image reconstruction module 50 stores the reconstructed image in a storage apparatus or a mass memory 46. Or, the image reconstruction module 50 transmits the reconstructed image to a computer 40 to generate information for diagnosing and evaluating patients.

Although the image reconstruction module 50 is illustrated as a separate entity in FIG. 1, in some embodiments, the image reconstruction module 50 may form part of the computer 40. Or, the image reconstruction module 50 may not exist in the system 10, or the computer 40 may perform one or a plurality of functions of the image reconstruction module 50. Furthermore, the image reconstruction module 50 may be located at a local or remote location and may be connected to the system 10 using a wired or wireless communication network. In some embodiments, computing resources with a centralized cloud communication network may be used for the image reconstruction module 50.

In some embodiments, the system 10 includes a control mechanism 30. The control mechanism 30 may include an X-ray controller 34 configured to provide power and timing signals to the X-ray radiation source 14. The control mechanism 30 may further include a gantry controller 32 configured to control a rotational speed and/or position of the gantry 12 based on imaging requirements. The control mechanism 30 may further include a carrying table controller 36 configured to drive a carrying table 28 to move to a suitable location so as to position the subject under examination in the gantry 12, thereby acquiring the projection data of the target volume of the subject under examination. Furthermore, the carrying table 28 includes a driving device, where the carrying table controller 36 may control the driving device to control the carrying table 28.

In some embodiments, the system 10 further includes the computer 40, where data sampled and digitized by the DAS 26 and/or an image reconstructed by the image reconstruction module 50 is transmitted to a computer or the computer 40 for processing. In some embodiments, the computer 40 stores the data and/or image in a storage apparatus such as a mass memory 46. The mass memory 46 may include a hard disk drive, a floppy disk drive, a CD-read/write (CD-R/W) drive, a digital versatile disc (DVD) drive, a flash drive, and/or a solid-state storage device. In some embodiments, the computer 40 transmits the reconstructed image and/or other information to a display 42, where the display 42 is communicatively connected to the computer 40 and/or the image reconstruction module 50. In some embodiments, the computer 40 may be connected to a local or remote display, printer, workstation and/or similar apparatus, for example, connected to such apparatuses of medical institutions or hospitals, or connected to a remote apparatus through one or a plurality of configured wires or a wireless communication network such as the Internet and/or a virtual private communication network.

Furthermore, the computer 40 may provide commands and parameters to the DAS 26 and the control mechanism 30 (including the gantry controller 32, the X-ray controller 34, and the carrying table controller 36) based on user provision and/or system definition, so as to control system operation, for example, data acquisition and/or processing. In some embodiments, the computer 40 controls system operation based on user input. For example, the computer 40 may receive user input such as commands, scanning protocols and/or scanning parameters, through an operator console 48 connected thereto. The operator console 48 may include a keyboard (not shown) and/or touch screen to allow a user to input/select commands, scanning protocols and/or scanning parameters. Although FIG. 1 exemplarily shows only one operator console 48, the computer 40 may be connected to more operating consoles, for example, for inputting or outputting system parameters, requesting medical examination, and/or viewing images.

In some embodiments, the system 10 may include or be connected to an image storage and transmission system (PACS) (not shown in the figure). In some embodiments, the PACS is further connected to a remote system such as a radiology information system, a hospital information system, and/or an internal or external communication network (not shown) to allow operators at different locations to provide commands and parameters and/or access image data.

The method or process described further below may be stored as executable instructions in a non-volatile memory in a computing apparatus of the system 10. For example, the computer 40 may include the executable instructions in the non-volatile memory, and may use the method described herein to automatically perform part or all of the scanning process, for example, select suitable protocols and determine suitable parameters. As another example, the image reconstruction module 50 may include the executable instructions in the non-volatile memory, and may use the method described herein to perform image reconstruction tasks.

The computer 40 may be configured and/or arranged for use in different manners. For example, in some implementations, a single computer 40 may be used; in other implementations, a plurality of computers 40 are configured to work together (for example, based on distributed processing configuration) or separately, where each computer 40 is configured to handle specific aspects and/or functions, and/or process data for generating models used only for a specific medical imaging system 10. In some implementations, the computer 40 may be local (for example, in the same position as one or a plurality of medical imaging systems 10, for example, in the same facility and/or the same local communication network); in other implementations, the computer 40 may be remote and thus can only be accessed via a remote connection (for example, via the Internet or other available remote access technologies).

Figure 2:
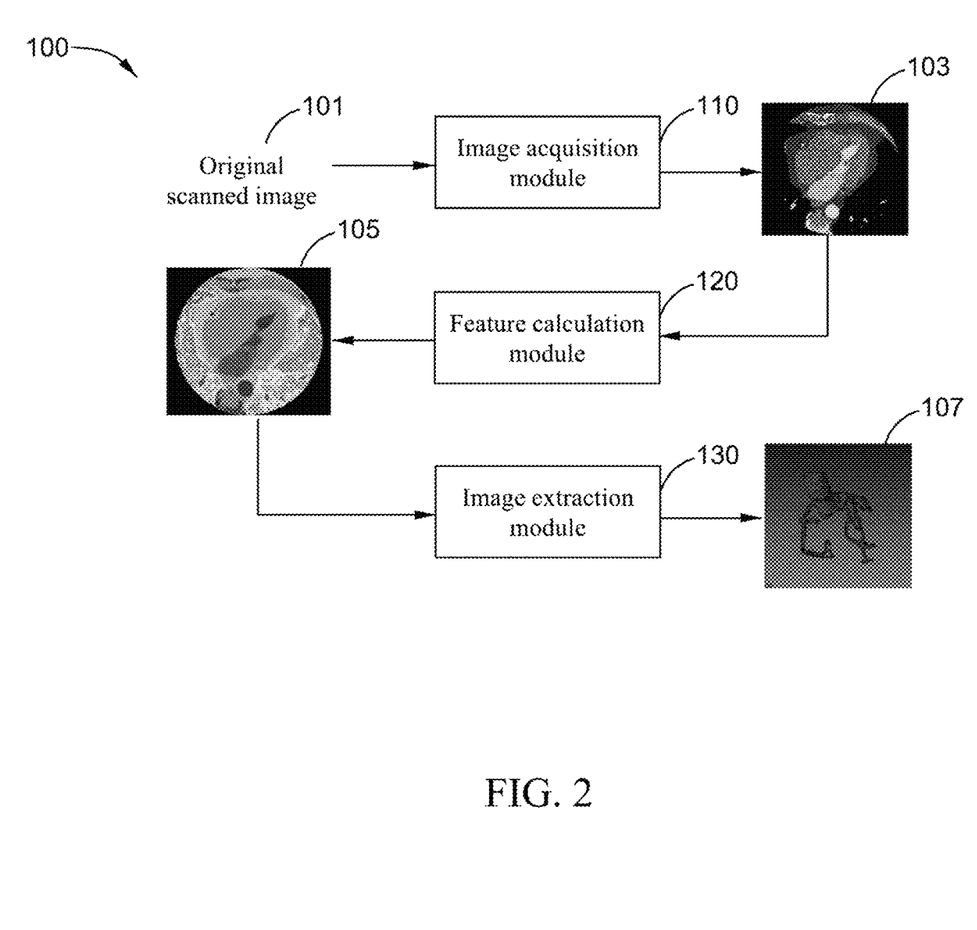
FIG. 2 is a schematic diagram of a device for extracting a blood vessel wall according to some embodiments of the present invention.

FIG. 2 shows a device 100 for extracting a blood vessel wall according to some embodiments of the present invention. As shown in FIG. 2, the device 100 for extracting a blood vessel wall includes an image acquisition module 110, a feature calculation module 120, and an image extraction module 130. The image acquisition module 110 is configured to acquire a medical image 103, the feature calculation module 120 is configured to determine at least one first-order feature 105 in the medical image 103, and the image extraction module 130 is configured to extract, on the basis of the at least one first-order feature 105, a blood vessel wall image 107 from the medical image 103.

In some embodiments, the image acquisition module 110 may include a preprocessing unit (not shown in the figure), wherein the preprocessing unit can preprocess an original scanned image 101, and use the preprocessed image as the medical image 103. Specifically, the original scanned image 101 refers to original data or image acquired after scanning. The original scanned image 101 may be directly acquired from a medical imaging system (for example, a CT system, an MRI system, a PET system, a PET-CT system, etc.), or may be acquired from a workstation or a PACS.

Specifically, the preprocessing includes at least one of cropping, resampling, Laplacian image enhancement (or edge enhancement), and denoising operations on the original scanned image, wherein the cropping can zoom in or out a region of interest in the original scanned image to facilitate subsequent operations, the resampling can allow the original scanned to image have the same size, for example, 0.5*0.5*0.5, the Laplacian image enhancement can increase the resolution and/or contrast of the image and increase the sharpness of the image, and the denoising can reduce noise and/or artifacts in the image and improve the quality of the image.

In some embodiments, the at least one first-order feature includes at least one of features such as an energy, a maximum, a minimum, a mean, a variance, a regional uniformity, a mean absolute deviation, and an entropy. Specifically, the aforementioned at least one first-order feature may be obtained by calculating pixel values or voxel values of all pixel points in the region of interest of the medical image.

Specifically, the energy refers to the sum of squares of all the voxel values in the region of interest, the minimum refers to the minimum among all the voxel values in the region of interest, and the maximum refers to the maximum among all the voxel values in the region of interest, the mean refers to the average of all the voxel values in the region of interest, the mean absolute deviation (MAD) is the average distance between all the voxel values and the mean, the variance is the average of the average distance between each voxel value and the mean value, the entropy is the uncertainty or randomness of the voxel values and is a value related to a normalized histogram volume (intensity value), and the regional uniformity is square of each intensity value.

In some embodiments, by mapping the at least one first-order feature to the medical image 103, a blood vessel wall can be characterized or visualized by a color change in the medical image, and then the blood vessel wall image 107 can be extracted.

Figure 3:
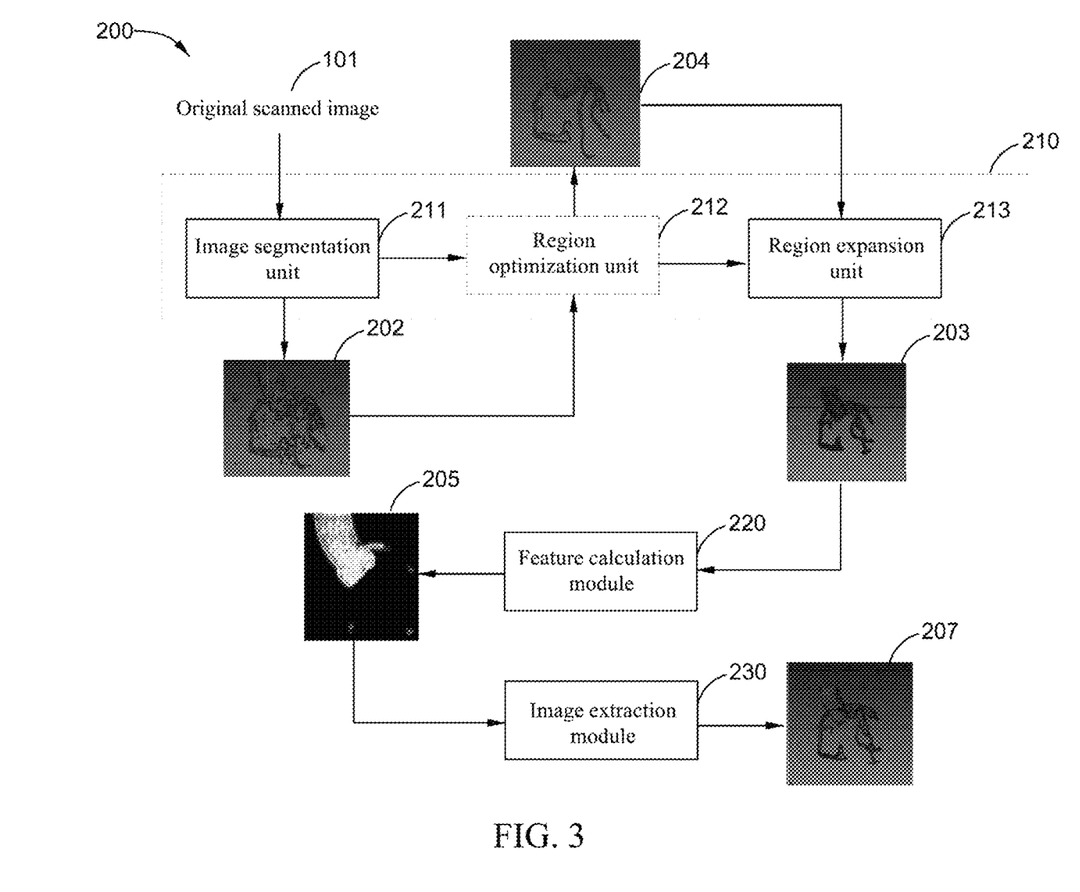
FIG. 3 is a schematic diagram of a device for extracting a blood vessel wall according to some other embodiments of the present invention.

FIG. 3 shows a device 200 for extracting a blood vessel wall according to some other embodiments of the present invention. As shown in FIG. 3, the device 200 for extracting a blood vessel wall includes an image acquisition module 210, a feature calculation module 220, and an image extraction module 230, wherein the image acquisition module 210 includes an image segmentation unit 211 and a region expansion unit 213. The image segmentation unit 211 is configured to perform image segmentation on an original scanned image 101 and determine a region of interest 202, and the region expansion unit 213 is configured to acquire a medical image 203 on the basis of the region of interest 202.

Specifically, the image segmentation unit 211 is further configured to determine, on the basis of a deep learning network, the region of interest 202 including a blood vessel lumen in the original scanned image 101. Specifically, the image segmentation unit 211 may include a training module (not shown in the figure), which is configured to obtain a deep learning network through training on the basis of a training sample image set, wherein the sample image set includes sample original images and sample blood vessel lumen images obtained after performing manual blood vessel lumen segmentation on the sample original images.

Specifically, the deep learning network may be obtained through training with a U-net or Dense V-net neural network or other well-known models. After the deep learning network is created or trained, a segmented blood vessel lumen image can be acquired simply by inputting an original scanned image 101 into the network.

In some embodiments, the region expansion unit 213 is further configured to expand the region of interest to acquire the medical image 203. Specifically, for a three-dimensional region of interest, the region expansion unit 213 first expands the region of interest of each layer respectively according to a preset expansion extent, which may be, for example, 5 millimeters. Secondly, the region expansion unit 213 will correct the expanded three-dimensional region of interest, for example, increase a local expansion extent, so that the expanded three-dimensional region of interest is smooth.

By expanding the region of interest including the blood vessel lumen, the blood vessel wall and plaque information thereon can be comprised in the acquired medical image 203. The aforementioned "expansion" refers to an extension of a region, and a pixel value or voxel value in the extended region does not change and is still a pixel value or voxel value in the original scanned image 101.

In some embodiments, the segmented blood vessel lumen image acquired by the deep learning network may include some unnecessary tissues or parts, which will increase the difficulty and complexity of expansion and first-order feature determination to a certain extent. Therefore, the image acquisition module 210 may further include a region optimization unit 212. The region optimization unit 212 is configured to optimize the region of interest on the basis of at least one of a region growing algorithm and a threshold method, and acquire the medical image 203 on the basis of the optimized region of interest 204.

Specifically, the region growing algorithm can merge pixel points with similar properties together. By selecting a seed point of each region, and then contrasting or comparing all pixel points in the region with the seed point, points with similar properties to the seed point are merged and continue to grow outward, knowing that there are no pixel points meeting conditions to be selected or merged, so that some unnecessary soft tissues or parts can be proposed. The threshold method can retain pixel points in a threshold range by setting a threshold range of pixel value or voxel value, and can also remove some unnecessary tissues or parts in the region of interest.

In some other embodiments, when the sample image set in the deep learning training module is more accurate, that is, the sample blood vessel lumen image is more accurate, the region of interest including the blood vessel lumen obtained via the deep learning network does not comprise some unnecessary tissue, and therefore optimization by the region optimization unit 212 is unnecessary. That is, the image segmentation unit 211 includes only the image segmentation unit 211 and the region expansion unit 213, and the region expansion unit 213 directly expands the region of interest acquired by the deep learning network.

In some embodiments, the image acquisition module 210 may further include a preprocessing unit (not shown in the figure), where the preprocessing unit may preprocess the original scanned image 101, and send the preprocessed image to the image segmentation unit to segment a blood vessel lumen.

The feature calculation module 220 is configured to determine at least one first-order feature 205 in the expanded region of interest (medical image 203), and the image extraction module 230 is configured to extract, on the basis of the at least one first-order feature, the blood vessel wall image 207 from the medical image 203.

In some embodiments, the device for extraction further includes a plaque analysis module (not shown in the figure), which is configured to perform a plaque analysis on the basis of the blood vessel wall image.

In some embodiments, the device for extraction further includes a feedback module (not shown in the figure), which is configured to correct an expansion extent of the region of interest on the basis of a result of the plaque analysis. Specifically, when the medical image obtained by the region expansion unit 213 by expanding the region of interest according to the preset expansion (for example, 5 millimeters) cannot include complete plaque information, feedback can be sent to the region expansion unit through the result of the plaque analysis, so as to correct the expansion, for example, to 6 millimeters or more, so that the medical image can include the complete plaque information.

The aforementioned deep learning network may include an input layer, an output layer, and a processing layer (or referred to as a hidden layer), wherein the input layer is used to preprocess input data or image, for example, deaveraging, normalization, or dimensionality reduction, and the processing layer may include a convolutional layer for performing feature extraction, a batch normalization layer for performing standard normal distribution on the input, and an excitation layer for performing a nonlinear mapping on an output result of the convolutional layer.

Each convolutional layer includes several neurons, and the number of the neurons in each layer may be the same or set differently as required. Based on the sample original images (known input) and sample precise images (expected output), the number of processing layers in the network and the number of neurons in each processing layer are set, and a weight and/or bias of the network is estimated (or adjusted or calibrated), so as to identify a mathematical relationship between the known input and the expected output and/or identify a mathematical relationship between the input and output of each layer.

Specifically, when the number of neurons in one of the layers is n, and values corresponding to the n neurons are $X_1$, $X_2, \ldots$ and $X_n$; the number of neurons in a next layer connected to the layer is m, and values corresponding to the m neurons are $Y_1, Y_2, \ldots$ and $Y_m$, and the two adjacent layers may be represented as:

$$Y_j = f\left(\sum_{i=1}^{n} W_{ji} X_i + B_j\right)$$

where $X_i$ represents a value corresponding to the i-th neuron of a previous layer, $Y_j$ represents a value corresponding to the j-th neuron of a next layer, $W_{ji}$ represents a weight, and $B_j$ represents a bias. In some embodiments, the function $f$ is a rectified linear function.

Thus, by adjusting the weight $W_{ji}$ and/or the bias $B_j$, the mathematical relationship between the input and output of each layer can be identified, so that a loss function converges, so as to obtain the aforementioned deep learning network through training.

In one embodiment, although the configuration of the deep learning network is guided by dimensions such as prior knowledge, input, and output of an estimation problem, optimal approximation of required output data is implemented depending on or exclusively according to input data. In various alternative implementations, clear meaning may be assigned to some data representations in the deep learning network using some aspects and/or features of data, an imaging geometry, a reconstruction algorithm, or the like, which helps to speed up training. This creates an opportunity to separately train (or pre-train) or define some layers in the deep learning network.

In some embodiments, the aforementioned trained network is obtained based on training by a training module on an external carrier (for example, an apparatus outside the medical imaging system). In some embodiments, the training system may include a first module configured to store a training data set, a second module configured to perform training and/or update based on a model, and a communication network configured to connect the first module and the second module. In some embodiments, the first module includes a first processing unit and a first storage unit, where the first storage unit is configured to store the training data set, and the first processing unit is configured to receive a relevant instruction (for example, acquiring a training data set) and send the training data set according to the instruction. In addition, the second module includes a second processing unit and a second storage unit, where the second storage unit is configured to store a training model, and the second processing unit is configured to receive a relevant instruction and perform training and/or update of the network. In some other embodiments, the training data set may further be stored in the second storage unit of the second module, and the training system may not include the first module. In some embodiments, the communication network may include various connection types, such as wired or wireless communication links, or fiber-optic cables.

Once data (for example, a trained network) is generated and/or configured, the data can be replicated and/or loaded into the medical imaging system 10, which may be accomplished in a different manner. For example, models may be loaded via a directional connection or link between the medical imaging system 10 and the computer 40. In this regard, communication between different elements may be accomplished using an available wired and/or wireless connection and/or based on any suitable communication (and/or network) standard or protocol. Alternatively or additionally, the data may be indirectly loaded into the medical imaging system 10. For example, the data may be stored in a suitable machine-readable medium (for example, a flash memory card), and then the medium is used to load the data into the medical imaging system 10 (for example, by a user or an authorized person of the system on site); or the data may be downloaded to an electronic apparatus (for example, a notebook computer) capable of local communication, and then the apparatus is used on site (for example, by a user or an authorized person of the system) to upload the data to the medical imaging system 10 via a direct connection (for example, a USB connector).

As discussed herein, the deep learning technology (also referred to as deep machine learning, hierarchical learning, deep structured learning, or the like) employs an artificial neural network for learning. The deep learning method is characterized by using one or a plurality of network architectures to extract or simulate data of interest. The deep learning method may be implemented using one or a plurality of processing layers (for example, an input layer, an output layer, a convolutional layer, a normalization layer, or a sampling layer, where processing layers of different numbers and functions may exist according to different deep network models), where the configuration and number of the layers allow a deep network to process complex information extraction and modeling tasks. Specific parameters (or referred to as "weight" or "bias") of the network are usually estimated through a so-called learning process (or training process). The learned or trained parameters usually result in (or output) a network corresponding to layers of different levels, so that extraction or simulation of different aspects of initial data or the output of a previous layer usually may represent the hierarchical structure or concatenation of layers. During image processing or reconstruction, this may be represented as different layers with respect to different feature levels in the data. Thus, processing may be performed layer by layer. That is, "simple" features may be extracted from input data for an earlier or higher-level layer, and then these simple features are combined into a layer exhibiting features of higher complexity. In practice, each layer (or more specifically, each "neuron" in each layer) may process input data as output data for representation using one or a plurality of linear and/or non-linear transformations (so-called activation functions). The number of the plurality of "neurons" may be constant among the plurality of layers or may vary from layer to layer.

As discussed herein, as part of initial training of a deep learning process to solve a specific problem, a training data set includes a known input value (for example, a sample image or a pixel matrix of the image subjected to coordinate transformation) and an expected (target) output value (for example, an image or an identification and determination result) finally outputted in the deep learning process. In this manner, a deep learning algorithm can process the training data set (in a supervised or guided manner or an unsupervised or unguided manner) until a mathematical relationship between a known input and an expected output is identified and/or a mathematical relationship between the input and output of each layer is identified and represented. In the learning process, (part of) input data is usually used, and a network output is created for the input data. Afterwards, the created network output is compared with the expected output of the data set, and then a difference between the created and expected outputs is used to iteratively update network parameters (weight and/or bias). A stochastic gradient descent (SGD) method may usually be used to update network parameters. However, those skilled in the art should understand that other methods known in the art may also be used to update network parameters. Similarly, a separate validation data set may be used to validate a trained network, where both a known input and an expected output are known. The known input is provided to the trained network so that a network output can be obtained, and then the network output is compared with the (known) expected output to validate prior training and/or prevent excessive training.

Figure 4:
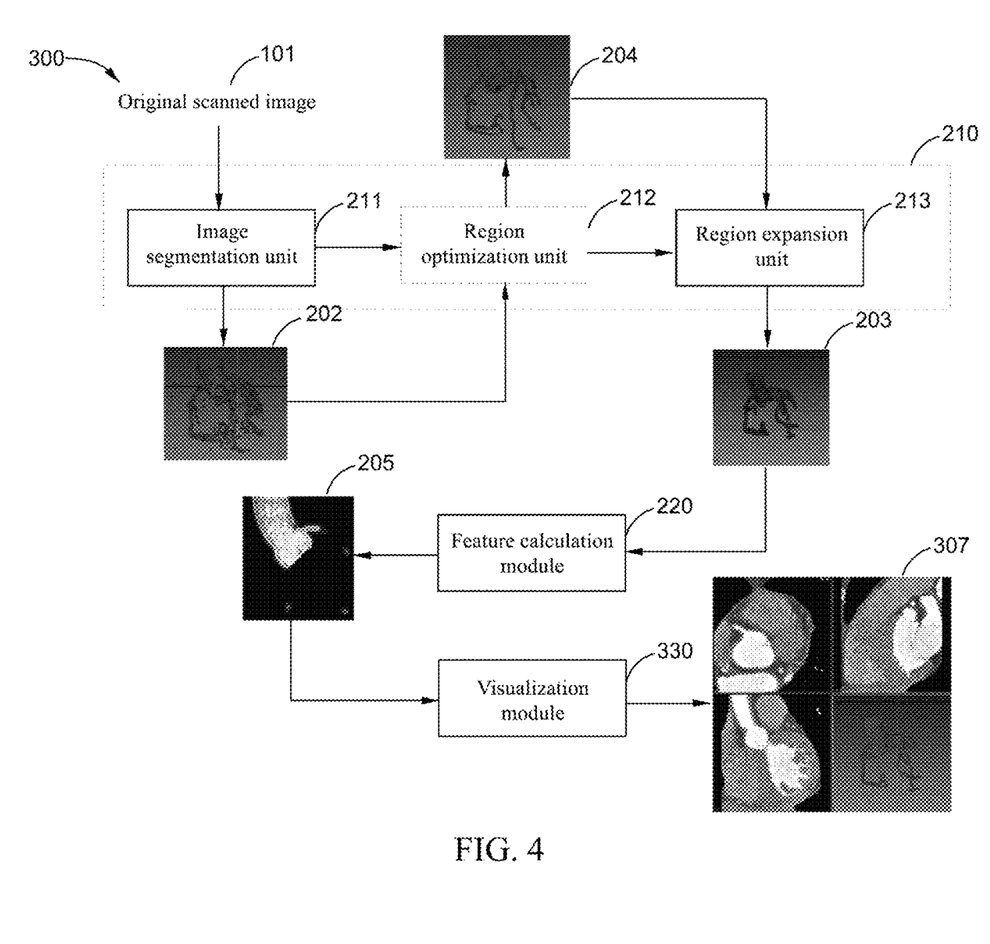
FIG. 4 is a schematic diagram of a device for extracting a blood vessel wall according to still some embodiments of the present invention.

FIG. 4 shows a device 300 for extracting a blood vessel wall according to some other embodiments of the present invention. As shown in FIG. 4, compared with the device 200 for extracting a blood vessel wall shown in FIG. 3, the device 300 for extracting a blood vessel wall includes a visualization module 330. The visualization module 330 can map at least one first-order feature 205 in a medical image 203 to visualize a blood vessel wall. An image 307 shows a graphical user interface of the device for extracting a blood vessel wall. As shown in the image 307, by mapping at least one first-order feature 205 to the medical image 203, the position or image of the blood vessel wall can be characterized or highlighted by color changes. After the visualization module 330 visualizes the position or image of the blood vessel wall, a blood vessel wall image can further be extracted, as shown in the lower right corner of the image 307.

Figure 5:
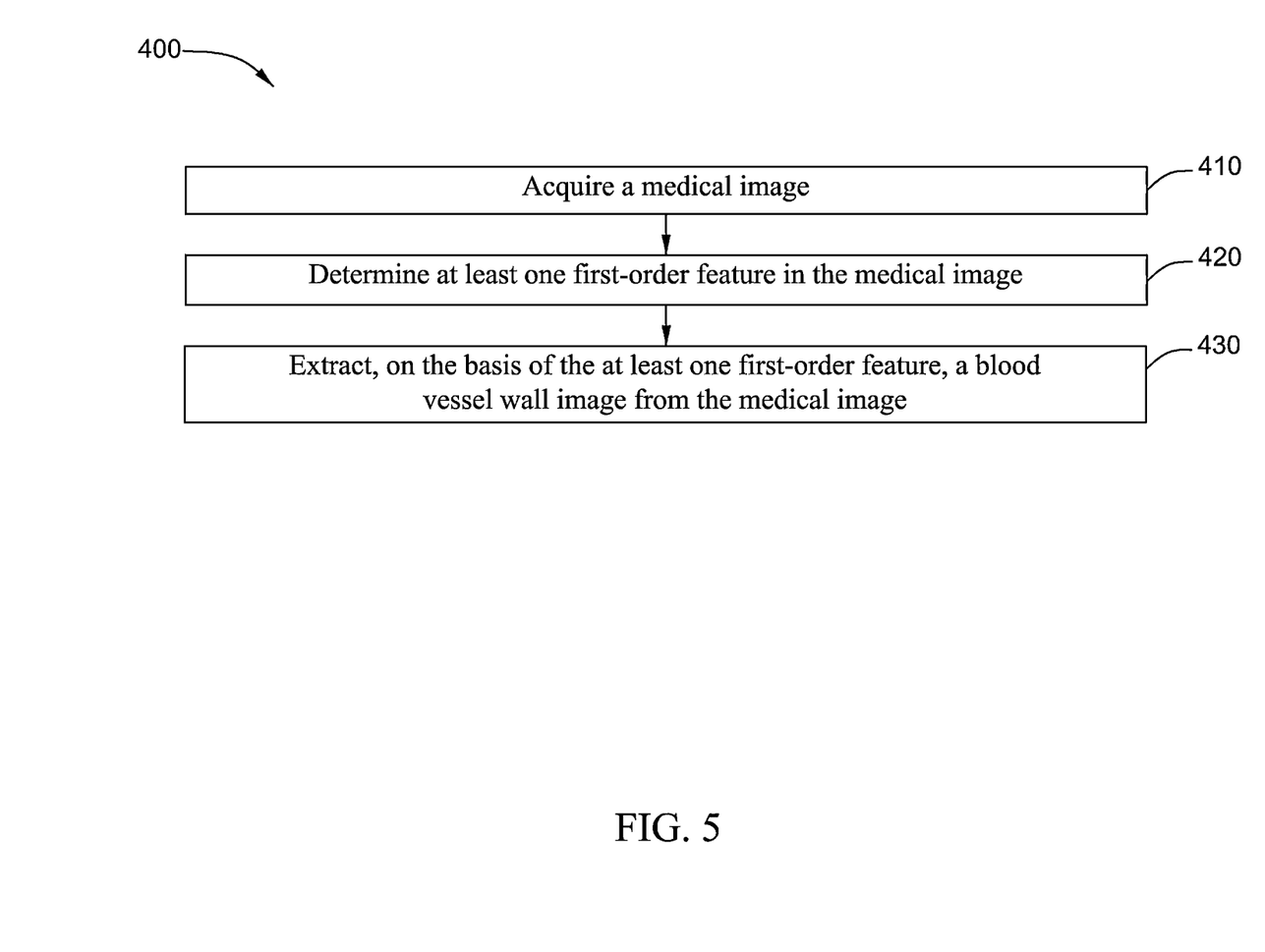
FIG. 5 is a flowchart of a method for extracting a blood vessel wall according to some embodiments of the present invention.

FIG. 5 shows a flowchart of a method 400 for extracting a blood vessel wall according to some embodiments of the present invention. As shown in FIG. 5, the method 400 for extracting a blood vessel wall includes step 410, step 420, and step 430.

In step 410, a medical image is acquired.

Specifically, an original scanned image may be preprocessed, and the preprocessed image is used as the medical image. The original scanned image refers to original data or image acquired after scanning. The original scanned image may be directly acquired from a medical imaging system (for example, a CT system, an MRI system, a PET system, a PET-CT system, etc.), or may be acquired from a workstation or a PACS.

The preprocessing further includes at least one of cropping, resampling, Laplacian image enhancement (or edge enhancement), and denoising operations on the original scanned image.

In step 420, at least one first-order feature in the medical image is determined.

Specifically, the at least one first-order feature includes at least one of an energy, a maximum, a minimum, a mean, a variance, a regional uniformity, a mean absolute deviation, and an entropy. Specifically, the aforementioned at least one first-order feature may be obtained by calculating pixel values or voxel values of all pixel points in the medical image.

In step 430, a blood vessel wall image is extracted, on the basis of the at least one first-order feature, from the medical image.

Specifically, by mapping the at least one first-order feature to the medical image, the blood vessel wall can be characterized or visualized on the medical image by color changes, and then the blood vessel wall image can be extracted.

Figure 6:
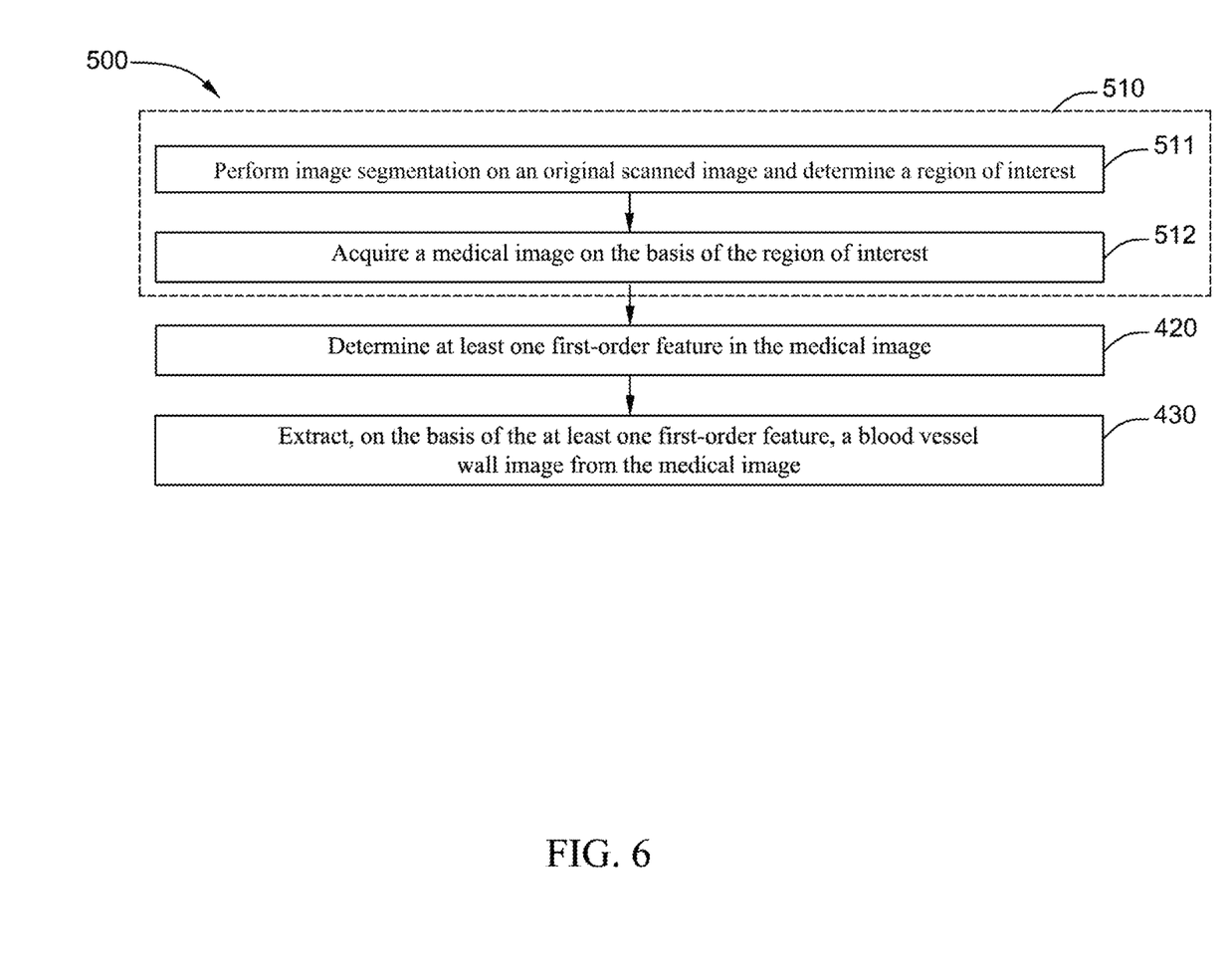
FIG. 6 is a flowchart of a method for extracting a blood vessel wall according to some other embodiments of the present invention.

FIG. 6 shows a flowchart of a method 500 for extracting a blood vessel wall according to some other embodiments of the present invention. Different from the method 400 for image segmentation shown in FIG. 5, step 510 of acquiring a medical image in the method 500 for extracting a blood vessel wall further includes step 511 and step 512.

In step 511, image segmentation is performed on an original scanned image and a region of interest is determined.

Specifically, the region of interest including a blood vessel lumen may be determined in the original scanned image on the basis of a deep learning network. The deep learning network may be a U-net or Dense V-net neural network or other well-known models and may be obtained through training on the basis of a training sample image set, wherein the sample image set includes sample original images and sample blood vessel lumen images obtained after artificial blood vessel lumen segmentation is performed on the sample original images. After the deep learning network is created or trained, a segmented blood vessel lumen image can be acquired simply by inputting an original scanned image into the network.

In step 512, the medical image is acquired on the basis of the region of interest.

Specifically, the region of interest is expanded to acquire the medical image. For a three-dimensional region of interest, firstly, a region of interest of each layer will be expanded respectively according to a preset expansion extent, which may be, for example, 5 millimeters. Secondly, the expanded three-dimensional region of interest is corrected, for example, an expansion extent of a certain part is increased, so that the expanded three-dimensional region of interest is smooth. By expanding the region of interest including the blood vessel lumen, plaque information can be comprised in the acquired medical image.

Figure 7:
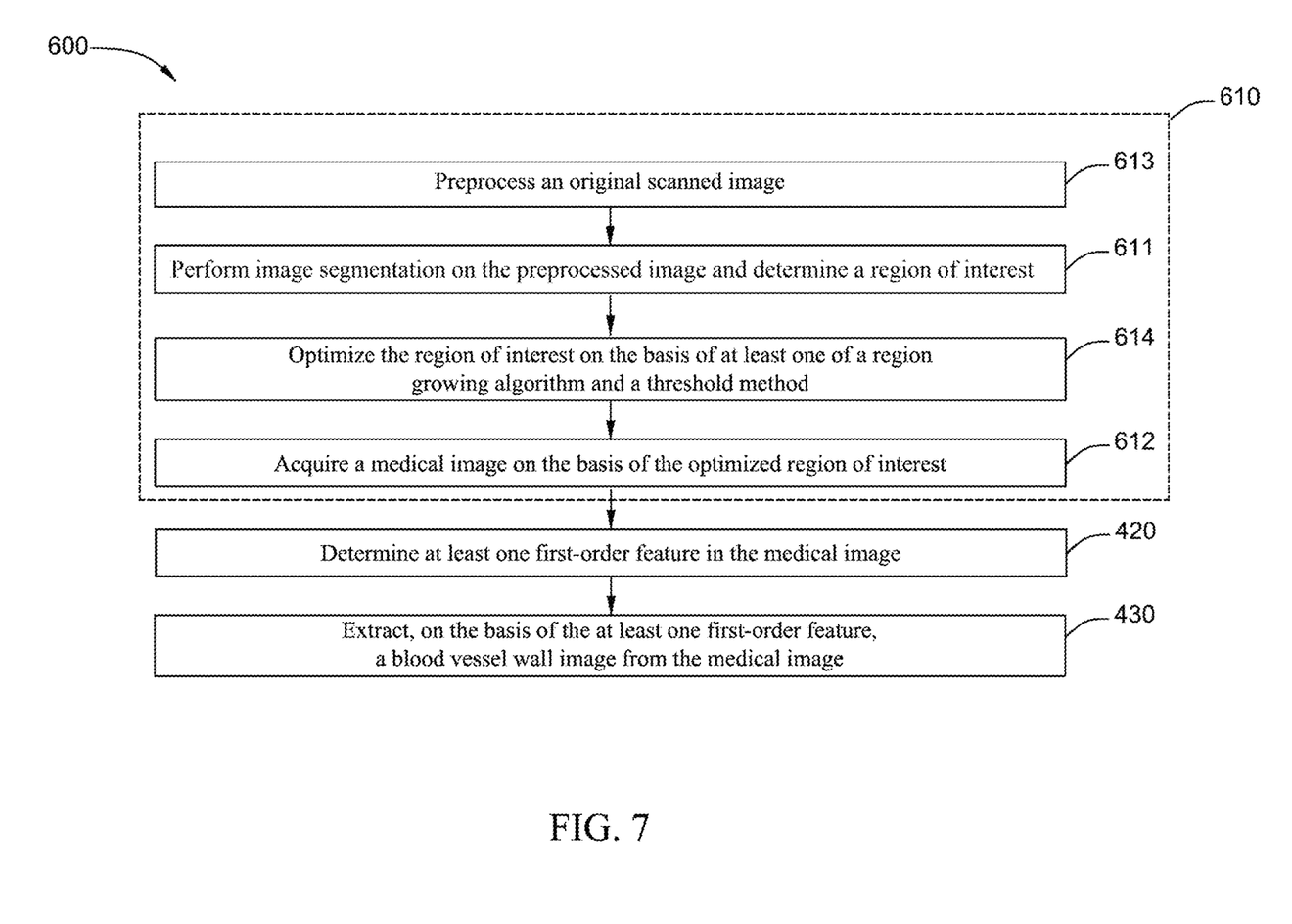
FIG. 7 is a flowchart of a method for extracting a blood vessel wall according to still some embodiments of the present invention.

FIG. 7 shows a flowchart of a method 600 for extracting a blood vessel wall according to some other embodiments of the present invention. Different from the method 500 for image segmentation shown in FIG. 6, step 610 of acquiring a medical image in the method 600 for extracting a blood vessel wall further includes step 614.

In step 614, a region of interest is optimized on the basis of at least one of a region growing algorithm and a threshold method, and the medical image is acquired on the basis of the optimized region of interest at step 612.

Specifically, the region growing algorithm can merge pixel points with similar properties together. By selecting a seed point of each region, and then contrasting or comparing all pixel points in the region with the seed point, points with similar properties to the seed point are merged and continue to grow outward, knowing that there are no pixel points meeting conditions to be selected or merged, so that some unnecessary soft tissues or parts can be proposed. The threshold method can retain pixel points in a threshold range by setting a threshold range of pixel value or voxel value, and can also remove some unnecessary tissues or parts in the region of interest.

In some embodiments, step 610 further includes step 613. In step 613, an original scanned image is preprocessed, and in step 611, image segmentation is performed on the preprocessed image and the region of interest is determined.

Figure 8:
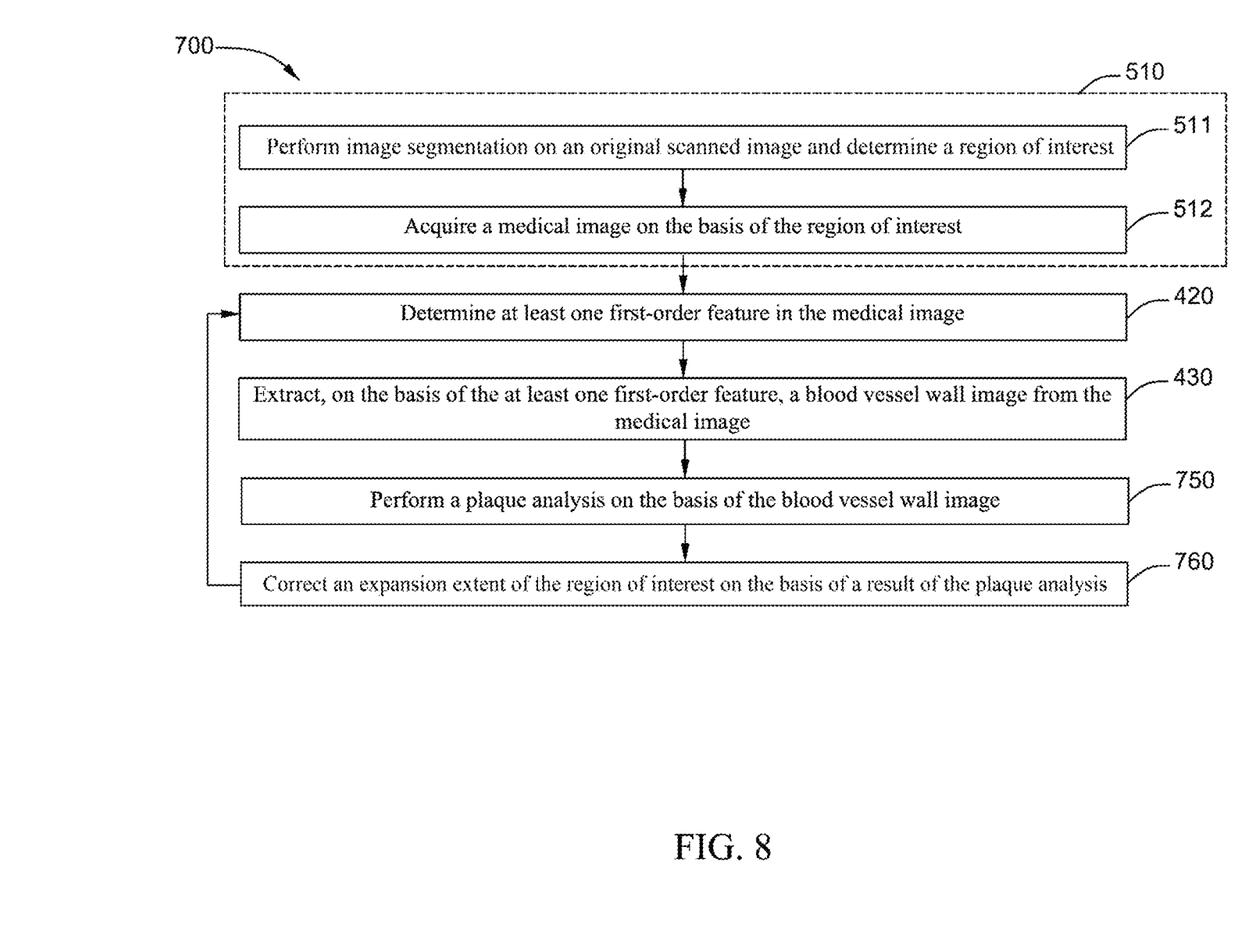
FIG. 8 is a flowchart of a method for extracting a blood vessel wall according to still some other embodiments of the present invention; and, FIG. 9 is a flowchart of a method for extracting a blood vessel wall according to still some other embodiments of the present invention.

FIG. 8 shows a flowchart of a method 700 for extracting a blood vessel wall according to some other embodiments of the present invention. Different from the method 500 for image segmentation shown in FIG. 6, the method 700 for extracting a blood vessel wall further includes step 750 and step 760.

In step 750, a plaque analysis is performed on the basis of a blood vessel wall image.

In step 760, an expansion extent of a region of interest is corrected on the basis of a result of the plaque analysis.

Specifically, when a medical image obtained by expanding the region of interest according to a preset expansion extent (for example, 5 millimeters) cannot include complete plaque information, feedback can be sent to a region expansion unit through the result of the plaque analysis to correct the expansion, for example, to 6 millimeters or more, so that the medical image can include the complete plaque information.

Figure 9:
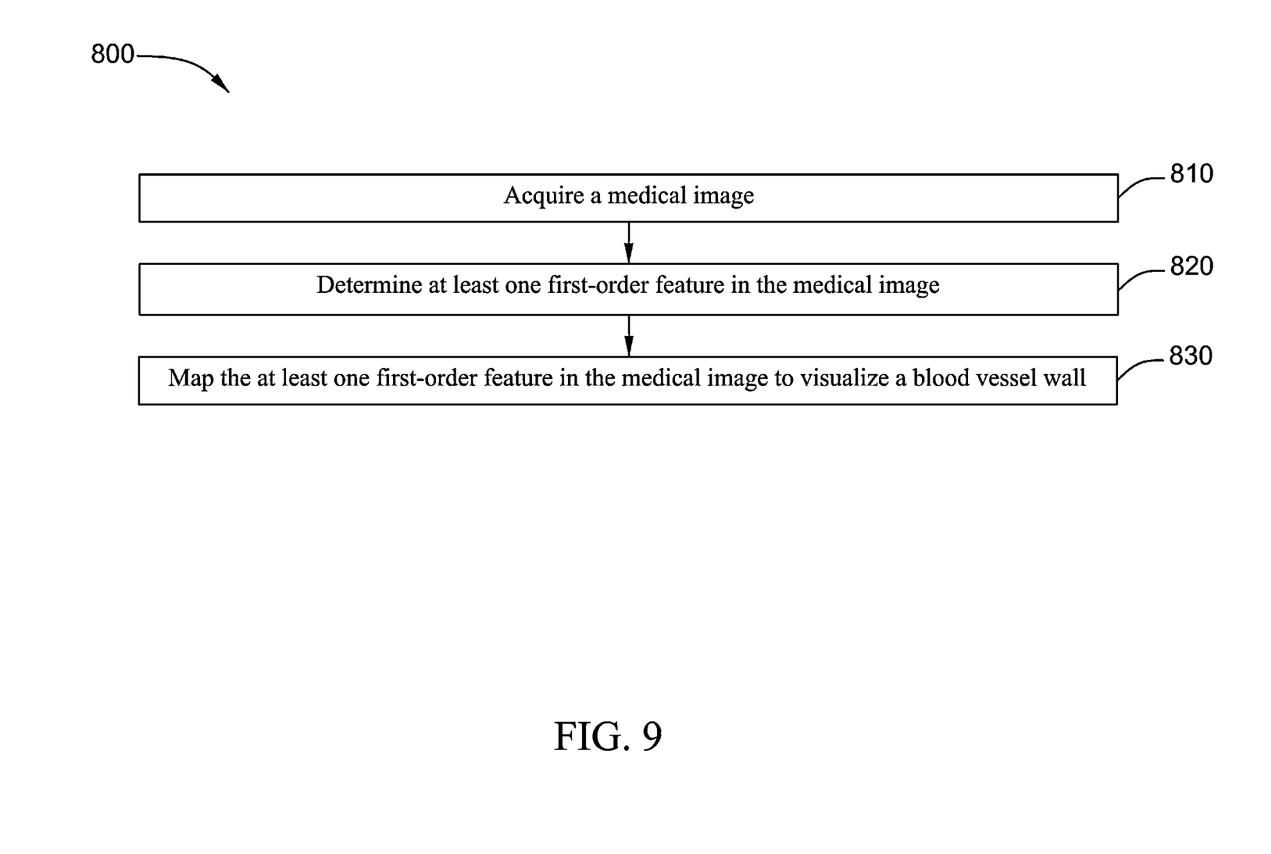

FIG. 9 shows a flowchart of a method 800 for extracting a blood vessel wall according to some embodiments of the present invention. As shown in FIG. 9, the method 800 for extracting a blood vessel wall includes step 810, step 820, and step 830.

In step 810, a medical image is acquired.

In step 820, at least one first-order feature in the medical image is determined.

In step 830, the at least one first-order feature is mapped in the medical image to visualize the blood vessel wall.

Specifically, by mapping the at least one first-order feature to the medical image, the position or image of the blood vessel wall can be characterized or highlighted by color changes.

According to the method for extracting a blood vessel wall proposed by the present invention, it is possible to visualize a blood vessel wall image in a medical image by determining a first-order feature in the medical image, and then extract a blood vessel wall image. However, it takes long time to determine the first-order feature in the entire medical image. Preferably, it is possible to roughly determine the region of interest comprising the blood vessel wall on the basis of segmentation of a blood vessel lumen and region expansion, and then determine the first-order feature in the region of interest to quickly and conveniently determine or extract the blood vessel wall image The present invention may further provide a non-transitory computer-readable storage medium for storing an instruction set and/or a computer program. When executed by a computer, the instruction set and/or computer program causes the computer to perform the aforementioned image noise reduction method. The computer executing the instruction set and/or computer program may be a computer of a medical imaging system, or may be other devices/modules of the medical imaging system. In one embodiment, the instruction set and/or computer program may be programmed into a processor/controller of the computer.

Specifically, when executed by the computer, the instruction set and/or computer program causes the computer to:
acquire a medical image;
determine at least one first-order feature in the medical image; and
extract, on the basis of the at least one first-order feature, a blood vessel wall image from the medical image.

The instructions described above may be combined into one instruction for execution, and any of the instructions may also be split into a plurality of instructions for execution. Moreover, the present invention is not limited to the instruction execution order described above.

As used herein, the term "computer" may include any processor-based or microprocessor-based system including a system that uses a microcontroller, a reduced instruction set computer (RISC), an application specific integrated circuit (ASIC), a logic circuit, and any other circuit or processor capable of executing the functions described herein. The above examples are merely exemplary and thus are not intended to limit the definition and/or meaning of the term "computer" in any manner.

The instruction set may include various commands that instruct a computer acting as a processor or instruct a processor to perform particular operations, such as the methods and processes of various embodiments. The instruction set may be in the form of a software program, and the software program can form part of one or a plurality of tangible, non-transitory computer-readable media. The software may be in various forms such as system software or application software. In addition, the software may be in the form of a set of independent programs or modules, a program module within a larger program, or part of a program module. The software may also include modular programming in the form of object-oriented programming. The input data may be processed by the processor in response to an operator command, or in response to a previous processing result, or in response to a request made by another processor.

Some exemplary embodiments have been described above; however, it should be understood that various modifications can be made. For example, if the described techniques are performed in a different order and/or if the components of the described system, architecture, device, or circuit are combined in other manners and/or replaced or supplemented with additional components or equivalents thereof, a suitable result can be achieved. Accordingly, other implementations also fall within the protection scope of the claims.

The invention claimed is:

1. A method for extracting a blood vessel wall, comprising:
performing image segmentation on an original scanned image and determining a region of interest;
expanding an expansion extent of the region of interest to provide an expanded region of interest;
acquiring a medical image based on the expanded region of interest;
determining at least one first-order feature in the medical image; and extracting, on the basis of the at least one first-order feature, a blood vessel wall image from the medical image.

2. The method for extracting a blood vessel wall according to claim 1, wherein the acquiring a medical image comprises preprocessing the original scanned image.

3. The method for extracting a blood vessel wall according to claim 1, wherein the image segmentation comprises:
determining, on the basis of a deep learning network, the region of interest comprising a blood vessel lumen in the original scanned image.

4. The method for extracting a blood vessel wall according to claim 3, comprising optimizing the region of interest on the basis of at least one of a region growing algorithm and a threshold method prior to the expanding the expansion extent of the region of interest.

5. The method for extracting a blood vessel wall according to claim 1, further comprising:
performing a plaque analysis on the basis of the blood vessel wall image.

6. The method for extracting a blood vessel wall according to claim 5, further comprising:
correcting the expansion extent of the region of interest on the basis of a result of the plaque analysis.

7. The method for extracting a blood vessel wall according to claim 1, wherein the at least one first-order feature comprises at least one of an energy value, a maximum value, a mean value, a variance value, a mean absolute deviation value, a regional uniformity, and an entropy value.

8. A non-transitory computer-readable storage medium for storing a computer program, wherein when executed by a computer, the computer program causes the computer to perform the method for extracting a blood vessel wall according to claim 1.

9. A method for visualizing a blood vessel wall, comprising:
performing image segmentation on an original scanned image and determining a region of interest;
expanding an expansion extent of the region of interest to provide an expanded region of interest;
acquiring a medical image based on the expanded region of interest;
determining at least one first-order feature in the image to be extracted; and
mapping the at least one first-order feature in the medical image to visualize the blood vessel wall.

10. A device for extracting a blood vessel wall, comprising:
an image acquisition module, configured to acquire a medical image, wherein the image acquisition module comprises:
an image segmentation unit, configured to perform image segmentation on an original scanned image and determine a region of interest; and
a region expansion unit, configured to:
expand an expansion extent of the region of interest to provide an expanded region of interest; and
acquire the medical image based on the expanded region of interest;
a feature calculation module, configured to determine at least one first-order feature in the medical image; and
an image extraction module, configured to extract a blood vessel wall image from the medical image on the basis of the at least one first-order feature.

11. The device for extracting a blood vessel wall according to claim 10, wherein the image acquisition module comprises a preprocessing unit, the preprocessing unit being configured to preprocess the original scanned image.

12. The device for extracting a blood vessel wall according to claim 10, wherein the image segmentation unit is further configured to determine, on the basis of a deep learning network, the region of interest comprising a blood vessel lumen in the original scanned image.

13. The device for extracting a blood vessel wall according to claim 10, wherein the image acquisition module further comprises:
a region optimization unit, configured to optimize the region of interest on the basis of at least one of a region growing algorithm and a threshold method prior to the region expansion unit expanding the expansion extent of the region of interest.

14. The device for extracting a blood vessel wall according to claim 10, further comprising:
a plaque analysis module, configured to perform a plaque analysis on the basis of the blood vessel wall image.

15. The device for extracting a blood vessel according to claim 14, further comprising:
a feedback module, configured to correct the expansion extent of the region of interest on the basis of a result of the plaque analysis.

16. A medical imaging system, comprising the device for extracting a blood vessel wall according to claim 10.

* * * * *